(12) United States Patent
Lee et al.

(10) Patent No.: US 12,294,109 B2
(45) Date of Patent: May 6, 2025

(54) BATTERY MODULE HAVING STRUCTURE CAPABLE OF DELAYING OUTFLOW OF FIRE-FIGHTING WATER INJECTED THEREIN IN CASE OF FIRE, AND BATTERY RACK AND ENERGY STORAGE DEVICE COMPRISING SAME

(71) Applicant: LG ENERGY SOLUTION, LTD., Seoul (KR)

(72) Inventors: Young-Seok Lee, Daejeon (KR); Sang-Hyun Jo, Daejeon (KR); Kyung-Hyun Bae, Daejeon (KR); Jin-Kyu Shin, Daejeon (KR); Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 509 days.

(21) Appl. No.: 17/628,828

(22) PCT Filed: Feb. 3, 2021

(86) PCT No.: PCT/KR2021/001424
§ 371 (c)(1),
(2) Date: Jan. 20, 2022

(87) PCT Pub. No.: WO2021/167270
PCT Pub. Date: Aug. 26, 2021

(65) Prior Publication Data
US 2022/0263192 A1    Aug. 18, 2022

(30) Foreign Application Priority Data
Feb. 17, 2020 (KR) .......................... 10-2020-0019308

(51) Int. Cl.
*H01M 50/383* (2021.01)
*A62C 3/16* (2006.01)
(Continued)

(52) U.S. Cl.
CPC ............. *H01M 50/383* (2021.01); *A62C 3/16* (2013.01); *A62C 35/10* (2013.01); *A62C 35/13* (2013.01);
(Continued)

(58) Field of Classification Search
None
See application file for complete search history.

(56) References Cited

U.S. PATENT DOCUMENTS 4,650,368 A * 3/1987 Bayer ..................... E02B 3/127
                                                    405/116
6,645,666 B1 * 11/2003 Moores, Jr. ......... H01M 10/652
                                                    429/83
(Continued)

FOREIGN PATENT DOCUMENTS

CN    109473598 A    3/2019
CN    208835775 U    5/2019
(Continued)

OTHER PUBLICATIONS

Amazon, Water Snake Moisture Absorber, Jan. 2, 2025 (Year: 2025).*
(Continued)

*Primary Examiner* — Ula C Ruddock
*Assistant Examiner* — Mary Grace Byram
(74) *Attorney, Agent, or Firm* — Birch, Stewart, Kolasch & Birch, LLP

(57) ABSTRACT

A battery module includes a cell stack including a plurality of battery cells stacked in a direction, a module housing having an internal space in which the cell stack is received and an air inlet and an air outlet through which air enters and exits, a valve installation hole formed through a side wall of the module housing, a feed valve nozzle installed at the valve installation hole facing the internal space of the
(Continued)

module housing, and a water expandable member provided in the module housing. The water expandable member expands in volume when it absorbs water during operation of the feed valve nozzle to close at least one of the air inlet, the air outlet or the valve installation hole.

15 Claims, 13 Drawing Sheets

(51) Int. Cl.
| | |
|---|---|
| A62C 35/10 | (2006.01) |
| A62C 35/13 | (2006.01) |
| A62C 37/36 | (2006.01) |
| H01M 10/48 | (2006.01) |
| H01M 10/6561 | (2014.01) |
| H01M 10/6566 | (2014.01) |
| H01M 50/20 | (2021.01) |
| H01M 50/204 | (2021.01) |
| H01M 50/211 | (2021.01) |
| H01M 50/24 | (2021.01) |
| H01M 50/60 | (2021.01) |
| H01M 50/636 | (2021.01) |
| H01M 50/673 | (2021.01) |

(52) U.S. Cl.
CPC .......... *A62C 37/36* (2013.01); *H01M 10/486* (2013.01); *H01M 10/6561* (2015.04); *H01M 10/6566* (2015.04); *H01M 50/20* (2021.01); *H01M 50/204* (2021.01); *H01M 50/211* (2021.01); *H01M 50/24* (2021.01); *H01M 50/636* (2021.01); *H01M 50/668* (2021.01); *H01M 50/673* (2021.01); *H01M 10/48* (2013.01); *H01M 2200/10* (2013.01); *H01M 2220/10* (2013.01)

(56) References Cited

U.S. PATENT DOCUMENTS

| | | |
|---|---|---|
| 7,960,048 B2 | 6/2011 | Jang et al. |
| 9,539,448 B2 | 1/2017 | Jung et al. |
| 2019/0319234 A1 | 10/2019 | Cordani et al. |

FOREIGN PATENT DOCUMENTS

| | | |
|---|---|---|
| CN | 209056524 U | 7/2019 |
| CN | 209859997 U | 12/2019 |
| EP | 2843727 A1 | 3/2015 |
| EP | 3989336 A1 | 4/2022 |
| JP | S59-079964 A | 5/1984 |
| JP | S62-066876 A | 3/1987 |
| JP | H09-241619 A | 9/1997 |
| JP | 10-208781 A | 8/1998 |
| JP | 2013-157133 A | 8/2013 |
| JP | 2014-216248 A | 11/2014 |
| JP | 5856472 B2 | 2/2016 |
| JP | 2018-523893 A | 8/2018 |
| JP | 2019-75191 A | 5/2019 |
| KR | 10-2007-0006000 A | 1/2007 |
| KR | 10-0719725 B1 | 5/2007 |
| KR | 10-1238062 B1 | 2/2013 |
| KR | 10-1424704 B1 | 7/2014 |
| KR | 10-1647427 B1 | 8/2016 |
| KR | 10-2017-0103170 A | 9/2017 |
| KR | 10-1939812 B1 | 1/2019 |

OTHER PUBLICATIONS

EP Search Report issued in corresponding Application No. 21757872.3 dated Dec. 7, 2022.
International Search Report for PCT/KR2021/001424 mailed on May 20, 2021.

* cited by examiner

BATTERY MODULE HAVING STRUCTURE CAPABLE OF DELAYING OUTFLOW OF FIRE-FIGHTING WATER INJECTED THEREIN IN CASE OF FIRE, AND BATTERY RACK AND ENERGY STORAGE DEVICE COMPRISING SAME

TECHNICAL FIELD

The present disclosure relates to a battery module capable of suppressing a fire at an early stage, and more particularly, to a battery module in which firewater is emergently fed and the outflow of the fed firewater is delayed to the maximum extent to maintain the water level in the battery module at a predetermined level or above, and a battery rack or an energy storage system comprising the same.

The present application claims the benefit of Korean Patent Application No. 10-2020-0019308 filed on Feb. 17, 2020 with the Korean Intellectual Property Office, the disclosure of which is incorporated herein by reference in its entirety.

BACKGROUND ART

In a battery module including a plurality of battery cells, when a failure such as a short circuit occurs in any battery cell, the battery cell has a temperature rises, and when the temperature of the battery cell is higher than the critical temperature, thermal runaway occurs. When thermal runaway occurs in the battery cell, the safety issue may be posed.

When flames occur due to the thermal runaway occurred in the battery cell, the temperature of adjacent battery cells sharply increases, and the thermal runaway may spread to the adjacent cells in a short time.

Eventually, when the thermal runaway occurred in the battery cell is not handled fast, disasters such as fires and explosion may occur the battery module or a battery rack which are a larger capacity battery unit than the battery cell, causing financial damage and safety problem.

Accordingly, when flames occur due to thermal runaway in any battery cell of the battery module, it is important to prevent flame propagation by lowering the temperature of the battery module rapidly.

Meanwhile, in the case of a battery module using an air-cooled structure, when firewater is fed in the event of a fire in the battery module, the firewater leaks out and does not stay in the battery module due to air channels in communication with the inside and the outside, making it difficult to suppress the fire. Accordingly, in the air-cooled battery module, it is required that the air channel is kept open in normal condition and is closed when feeding firewater.

DISCLOSURE

Technical Problem

The present disclosure is designed to solve the above-described problem, and therefore the present disclosure is aimed to emergently feeding firewater to suppress flames and propagation between battery cells when vent gas or flames occur in a battery cell of a battery module.

The present disclosure is aimed to delaying the outflow of the firewater to the maximum extent to maintain the level of firewater at a predetermined level or above in the battery module.

Technical Solution

To solve the above-described problem, a battery module according to the present disclosure includes a cell stack including a plurality of battery cells stacked in a direction, a module housing having an internal space in which the cell stack is received and an air inlet and an air outlet through which air enters and exits, a valve installation hole formed through a side wall of the module housing, a feed valve nozzle disposed facing the internal space of the module housing at a location of the valve installation hole, and an expandable member provided in the module housing, wherein the expandable member absorbs fluid to expand in volume during operation of the feed valve nozzle to close at least one of the air inlet, the air outlet or the valve installation hole.

The expandable member may include a nonwoven fabric holder comprising a frame having a space inside an edge and fixed and coupled to an inner surface of the module housing having the air inlet, the air outlet or the valve installation hole, and a superabsorbent nonwoven fabric attached to an inner surface of the nonwoven fabric holder.

The frame may be a rectangular frame, and the superabsorbent nonwoven fabric may be attached to each of a left side wall and a right side wall of the nonwoven fabric holder.

The space of the nonwoven fabric holder may be provided in communication with the air inlet, the air outlet or the valve installation hole.

The edge of the nonwoven fabric holder may surround the air inlet, the air outlet or the valve installation hole and may be provided in close contact with the inner surface of the module housing.

The expandable member may further include a mesh coupled to the nonwoven fabric holder to cover at least one of a front side or a rear side of the space of the frame.

The feed valve nozzle may include a glass bulb which blocks a channel through which the fluid will be forced out, and the glass bulb may receive a liquid therein and may be configured to break by volume expansion of the liquid at a predetermined temperature or above.

The feed valve nozzle may be inserted and disposed in the module housing through the valve installation hole.

The feed valve nozzle may be disposed in the module housing integrally with the module housing, and a diameter of the valve installation hole may corresponds to a diameter of a rear end of the feed valve nozzle.

According to another aspect of the present disclosure, there is provided a battery rack including a rack housing, a plurality of battery modules according to the present disclosure, arranged on top of one another in the rack housing, a water tank disposed in the rack housing or near the rack housing, a pipe connecting the water tank to each battery module of the plurality of battery, at least one sensor installed in the rack housing to detect thermal runaway occurring in at least one of the plurality of battery modules, and a controller to output a control signal for feeding the fluid into the battery module through the pipe when the thermal runaway is detected by the at least one sensor.

The battery rack may further include a plurality of control valves installed in the pipe, wherein each of the plurality of control valves may be installed near a respective one of the plurality of battery modules to individually allow or disallow a flow of the fluid fed into the plurality of battery modules, the at least one sensor may be installed in each of the plurality of battery modules, and the controller may output the control signal for opening the control valve installed near the battery module in which the thermal runaway was detected by the at least one sensor among the plurality of control valves.

According to still another aspect of the present disclosure, there is provided an energy storage system including at least one battery rack.

Advantageous Effects

According to the present disclosure, when vent gas or flames occur in a battery cell of a battery module, it is possible to suppress flames and propagation between battery cells by emergently feeding firewater.

In particular, the battery module according to the present disclosure includes the water expandable member which closes the vents in case of emergency, thereby allowing the emergently fed firewater to stay in the battery module while maintaining a predetermined water level. Accordingly, it is possible to effectively suppress flames and propagation between battery cells.

DETAILED DESCRIPTION

Figure 1:
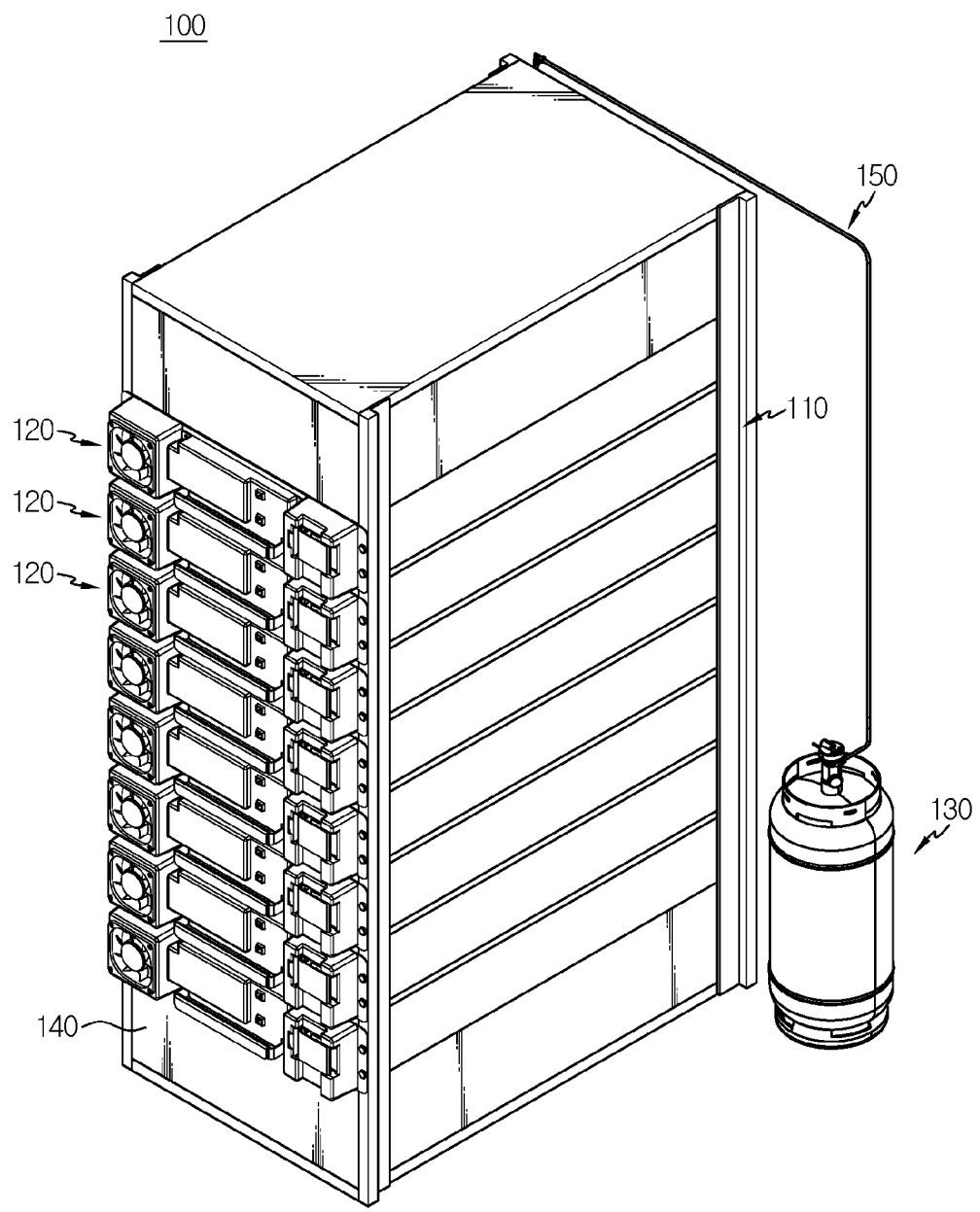
FIG. 1 is a perspective view schematically showing a battery rack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
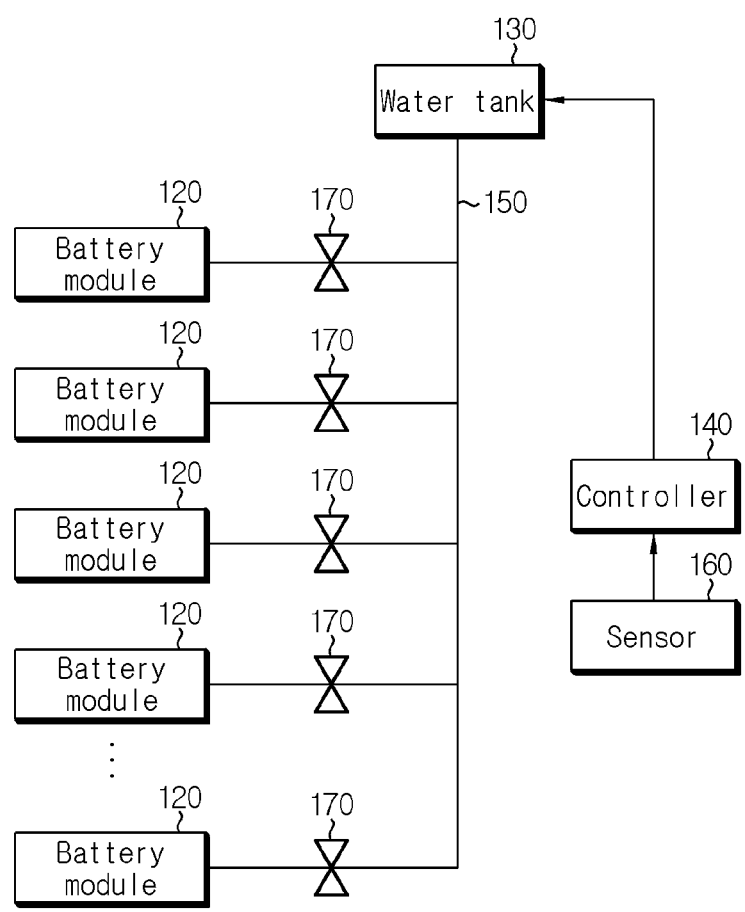
FIG. 2 is a reference drawing for describing a fire extinguishing system of the battery rack of FIG. 1.

FIG. 1 is a perspective view schematically showing a battery rack according to an embodiment of the present disclosure, and FIG. 2 is a reference drawing for describing a fire extinguishing system of the battery rack of FIG. 1.

Referring to FIG. 1, the battery rack 100 according to an embodiment of the present disclosure includes a rack housing 110 and a plurality of battery modules 120.

The rack housing 110 may include a plurality of frames, and may be configured to mount the plurality of battery modules 120 and a controller 140 therein.

The plurality of battery modules 120 may be stacked upon one another in the rack housing 110. As shown, the battery modules 120 are stacked and received in the rack housing 110 to increase the space utility, electrical connection convenience and energy density of the battery rack 100. Since the battery rack 100 has a dense arrangement of battery modules 120, a cooler is required for each battery module 120 for effective temperature management. Additionally, due to this structure of the battery rack 100, when flames occur in a specific battery module 120, the flames may easily spread to the other battery module 120.

The battery rack 100 according to the present disclosure further includes a water tank 130, the controller 140, a pipe 150 and a sensor 160 to prevent propagation and minimize damage when gas or flames occur in the battery module 120.

That is, in the battery rack 100 according to this embodiment, the water tank 130 in which firewater is stored may be disposed near the rack housing 110, and the water tank 130 may be connected to each battery module 120 using the pipe 150 to selectively supply the firewater to each battery module 120 in case of emergency. Here, the pipe 150 serves as a passage to transport the firewater from the water tank 130 to the battery module 120. Although not shown for convenience, a portion of the pipe 150 connected to each battery module 120 may be formed of a manifold type, namely, multi-branch manifold corresponding to the battery modules 120 arranged on top of one another.

In another example, the water tank 130 may be disposed within the rack housing 110, for example, on top of the rack housing 110. In this case, the water tank 130 and each battery module 120 may be connected with the short pipe 150, and without using a pump, the firewater may be rapidly supplied to the battery module 120 by a free fall and the water pressure. To supply the firewater more rapidly and smoothly, a pump may be applied to the water tank 130.

The fire extinguishing system of the battery rack 100 according to the present disclosure will be briefly described with reference to FIG. 2 as below.

Basically, the controller 140 of the battery rack 100 according to the present disclosure may serve as a battery management system (BMS) which manages the charge/discharge of the battery modules 120 and may be connected to the sensor 160 and the water tank 130 to output a control signal for opening the water tank 130 in response to a sensing signal of the sensor 160.

For example, when gas or a temperature rise above the reference is detected in the specific battery module 120 among the plurality of battery modules 120 due to thermal runaway occurred in the specific battery module 120, the controller 140 may output the control signal for opening the water tank 130 to supply the firewater to the specific battery module 120. In this instance, the sensor 160 may be used to detect the temperature of the battery module 120 or gas.

As described above, when thermal runaway occurs in at least any of the plurality of battery modules 120, the sensor 160 detects a temperature rise and/or gas emission and transmits the sensing signal to the controller 140. For example, the sensor 160 may be a temperature sensor, a gas detection sensor, or a combination thereof. The sensor 160 may be attached to the inner or outer side of each of the plurality of battery modules 120 to rapidly sense the temperature of the battery module 120 and/or gas occurring from the battery module 120.

Additionally, the battery rack 100 may further include control valves 170 installed multistep in the pipe 150 in a one-to-one relationship with each battery module 120 to individually allow or disallow a flow of firewater fed into the corresponding battery module 120.

To independently operate the plurality of control valves 170, at least one sensor 160 is provided in each battery module 120. When the sensor 160 is provided in each battery module 120, the firewater may be fed to only the battery module 120 in which thermal runaway occurred.

That is, when the controller 140 receives the sensing signal from the sensor 160, the controller 140 may determine that thermal runaway occurred in the battery module 120 including the sensor 160 having transmitted the sensing signal, and open the control valve 170 installed near the battery module 120 in which thermal runaway occurred among the plurality of control valves 170 to feed the firewater.

Subsequently, the battery module 120 applied to the battery rack 100 according to the present disclosure will be described in detail with reference to FIGS. 3 to 8.

The battery module 120 according to the present disclosure may include a cell stack 121, a module housing 123, a feed valve nozzle 125 and a water expandable member 127 provided in the module housing 123.

The cell stack 121 may include a plurality of battery cells 121a arranged in close contact along a direction (an X-axis direction). That is, in this embodiment, the cell stack 121 is formed using bidirectional pouch battery cells 121a in which a positive electrode lead and a negative electrode lead are disposed in opposite directions. A prismatic battery cell may be used as an alternative to the pouch battery cell 121a.

A busbar frame 121c may be mounted on the front surface and rear surface in the lengthwise direction of the cell stack 121. The busbar frame 121c may include busbars 121b of a metal plate shape in a predetermined pattern. The battery cells 121a may be connected in series and/or in parallel by integrally fixing a positive electrode lead of the battery cell 121a and a negative electrode lead of the other battery cell 121a to the surface of the busbar, for example, by welding.

The module housing 123 has an internal space in the shape of an approximately rectangular box to receive the cell stack 121 and an air inlet 122 and an air outlet 124 through which air enters and exits.

Figure 4:
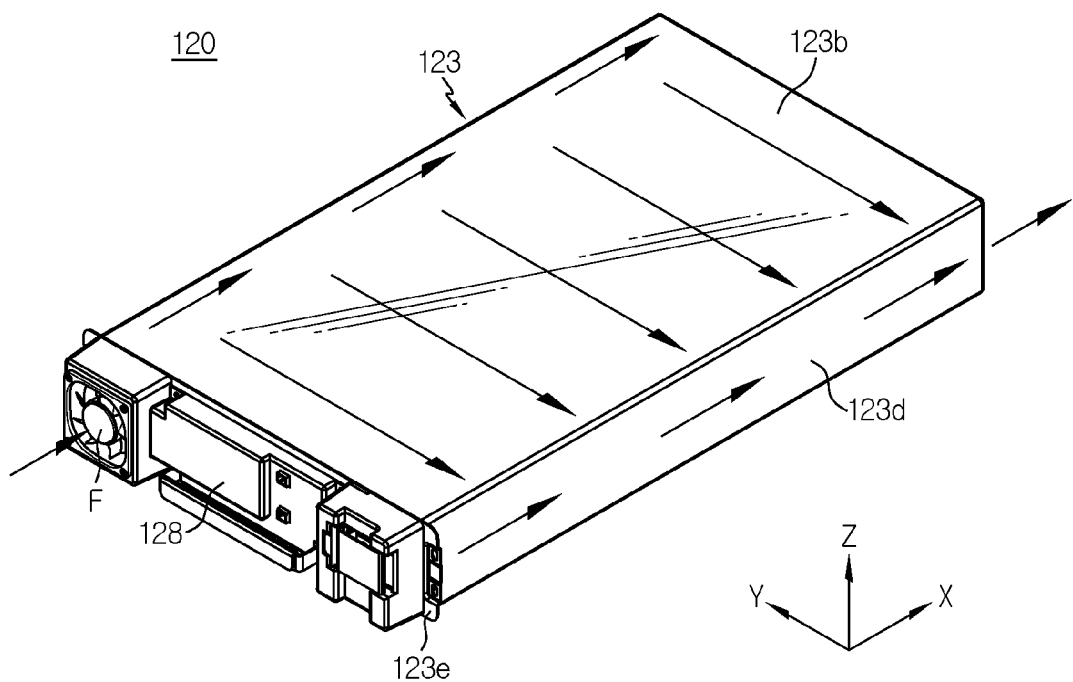
FIG. 4 is a front perspective view of a battery module according to an embodiment of the present disclosure.
Figure 5:
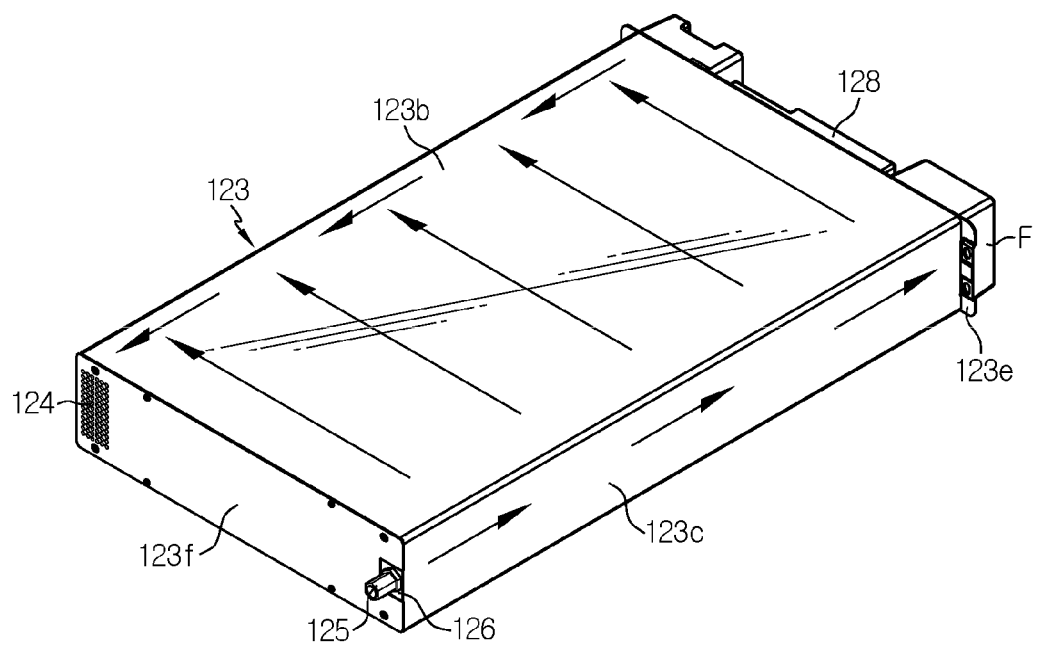
FIG. 5 is a rear perspective view of a battery module according to an embodiment of the present disclosure.
Figure 7:
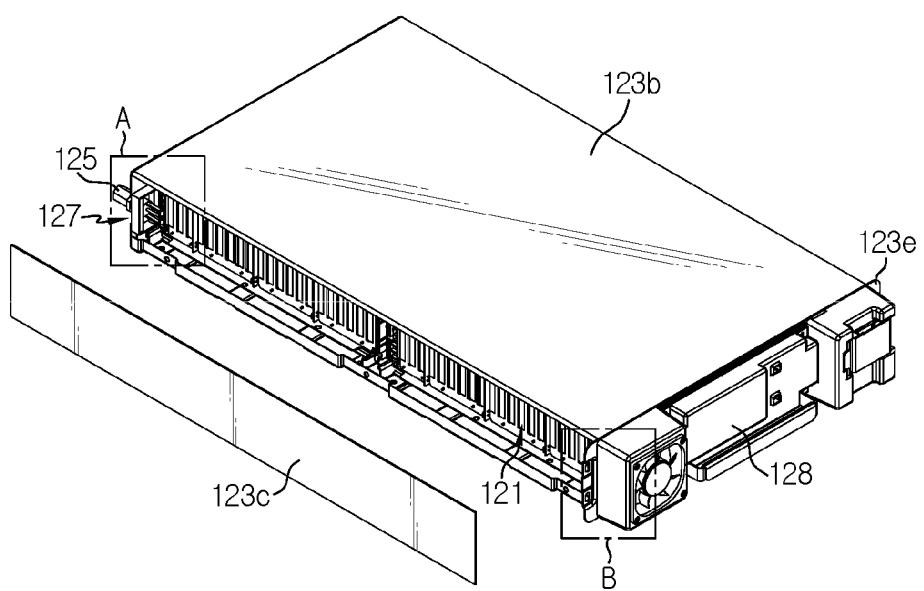
FIG. 7 is a perspective view of a left side plate of the battery module of FIG. 5.

Specifically, referring to FIGS. 4, 5 and 7, the module housing 123 according to this embodiment may be divided into a bottom plate 123a, a top plate 123b, left and right side plates 123c, 123d and front and rear plates 123e, 123f. Each of the six plates may be assembled and dissembled to form the module housing 123, or some of the six plates may be integrally formed and the remaining plates may be assembled and dissembled to form the module housing 123.

In the module housing 123 of this embodiment, the bottom plate 123a and the top plate 123b have the left-right width that is greater than the length of the cell stack 121, and the cell stack 121 may be disposed on the bottom plate 123a such that the lengthwise direction of the cell stack 121 matches the widthwise direction of the bottom plate 123a. In this instance, the front surface and the rear surface of the cell stack 121 may be spaced a predetermined distance apart from the left end and the right end of the bottom plate 123a respectively to form an air passage in the battery module 120.

Figure 3:
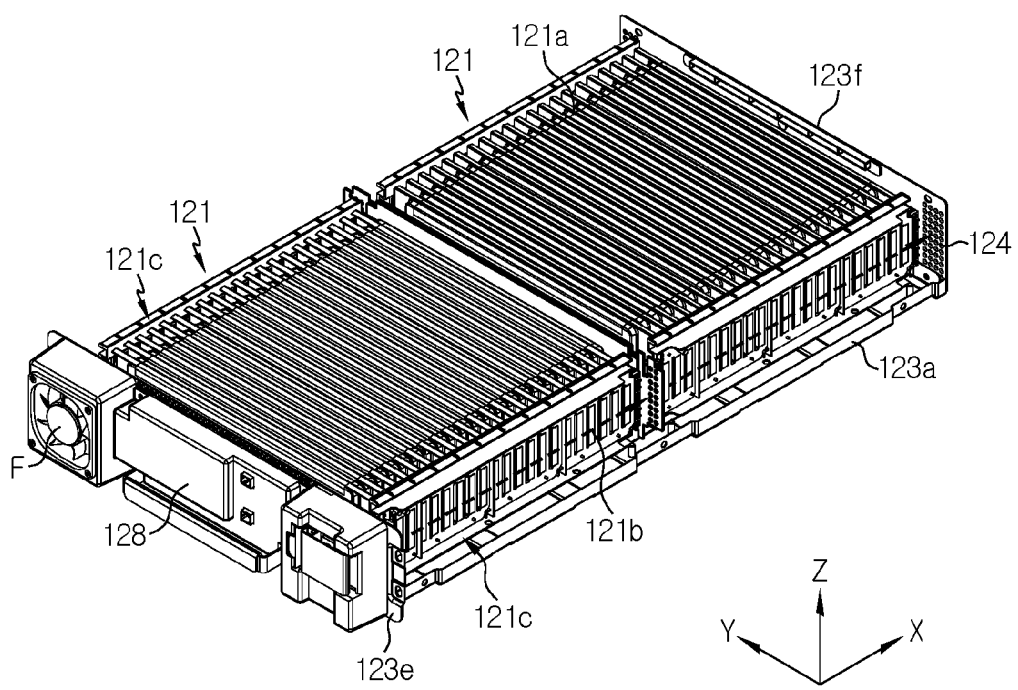
FIG. 3 is a partial exploded perspective view of a battery module according to an embodiment of the present disclosure.

With respect to FIGS. 3 and 4, in the module housing 123 of this embodiment, the air inlet 122 is provided on the left side of the front plate 123e, and the air outlet 124 is provided on the right side of the rear plate 123f. A circuit board for controlling the operation of the respective battery modules 120, a protection cover 128 for shielding the circuit board and a fan F for forcing the outside air into the air inlet 122 may be attached to the front surface of the front plate 123e.

According to this configuration, in the battery module 120 of the present disclosure, when the fan F works as indicated by the arrow in FIG. 4, the outside air enters the air inlet 122 on the front left side of the battery module 120 and exits the air outlet 124 at the rear right side of the battery module 120.

For reference, within the battery module 120, the outside air in the left air passage may flow to the right air passage through an empty space formed between the top of the cell stack 121 and the top plate 123b. In this instance, the battery cells 121a may be cooled by contact of the outside air with the top edges of the battery cells 121a. This embodiment cools the top edges of the battery cells 121a arranged in close contact to increase the energy density, but as opposed to this embodiment, the battery cells 121a may not be in completely close contact and they may be configured to allow air to flow therebetween.

The module housing 123 may be configured to receive one or more cell stacks 121 and the busbar frame 121c mounted thereon. For example, the module housing 123 of this embodiment is designed with a sufficient size to receive two sets of cell stacks 121, and the size may be changed to receive a set of cell stacks 121 or 3 or more cell stacks 121.

Additionally, as shown in FIG. 5, the module housing 123 may further include a valve installation hole 126 in the rear plate 123f, and the feed valve nozzle 125 may be disposed facing the internal space of the battery module 120 through the valve installation hole 126. The feed valve nozzle 125 may be connected to the pipe 150 to receive the firewater.

The feed valve nozzle 125 according this embodiment includes a glass bulb 125a which blocks a channel (an exit) through which the firewater will be forced out in normal condition and breaks to force the firewater out in case of emergency.

The glass bulb 125a may be configured to break by the volume expansion of a predetermined liquid at a predetermined temperature, for example, 70° C. to 100° C. For example, the liquid may be water. That is, when the internal temperature of the battery module 120 rises above the predetermined temperature, the exit of the feed valve nozzle 125 may be opened by the breakage of the glass bulb 125a which blocks the channel in which the firewater in the feed valve nozzle 125 flows.

According to this configuration, when gas or flames occur in the battery module 120, the firewater is emergently fed as indicated by the arrow in FIG. 5 and fills the internal space of the battery module 120.

Figure 6:
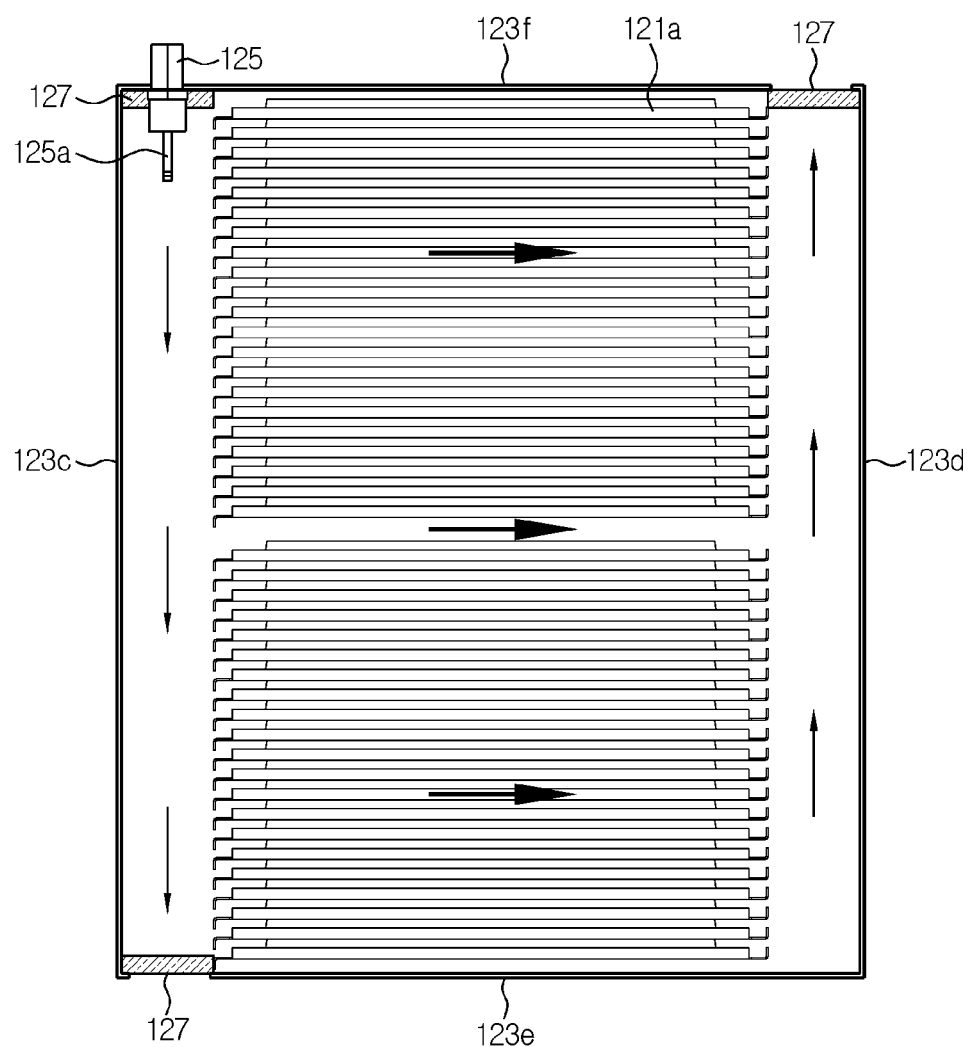
FIG. 6 is a diagram schematically showing a flow of firewater and a placement structure of a water expandable member in a battery module according to an embodiment of the present disclosure.

Meanwhile, when the firewater is emergently fed into the battery module 120, it is necessary to uniformly maintain the level of the firewater in the battery module 120 to effectively suppress the flames. To this end, as shown in FIG. 6, the battery module 120 according to the present disclosure includes the water expandable member 127 to close at least one of the air inlet 122, the air outlet 124 or the valve installation hole 126.

Figure 8:
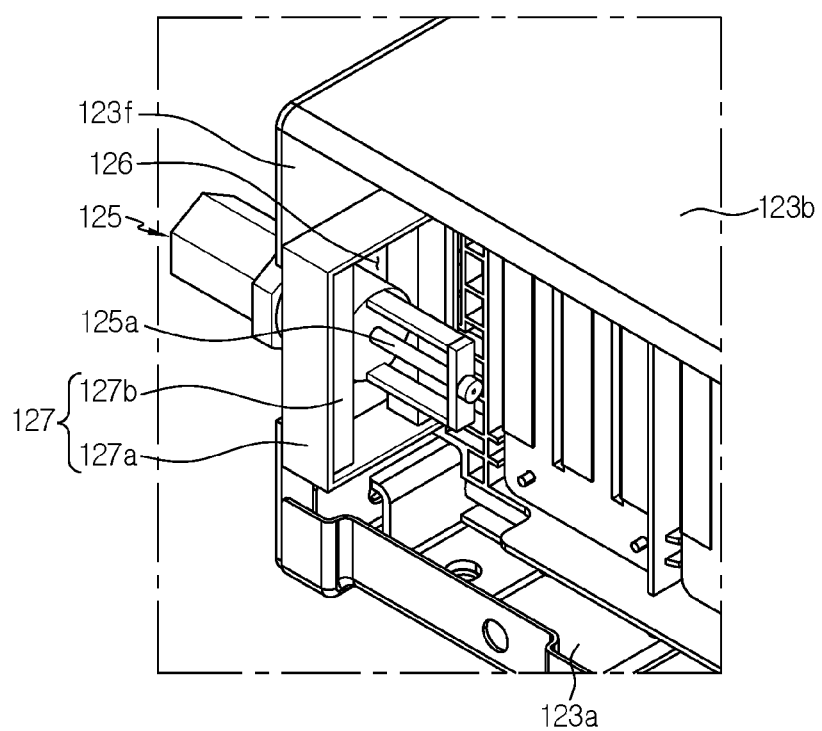
FIG. 8 is an enlarged diagram of section A FIG. 7.
Figure 9:
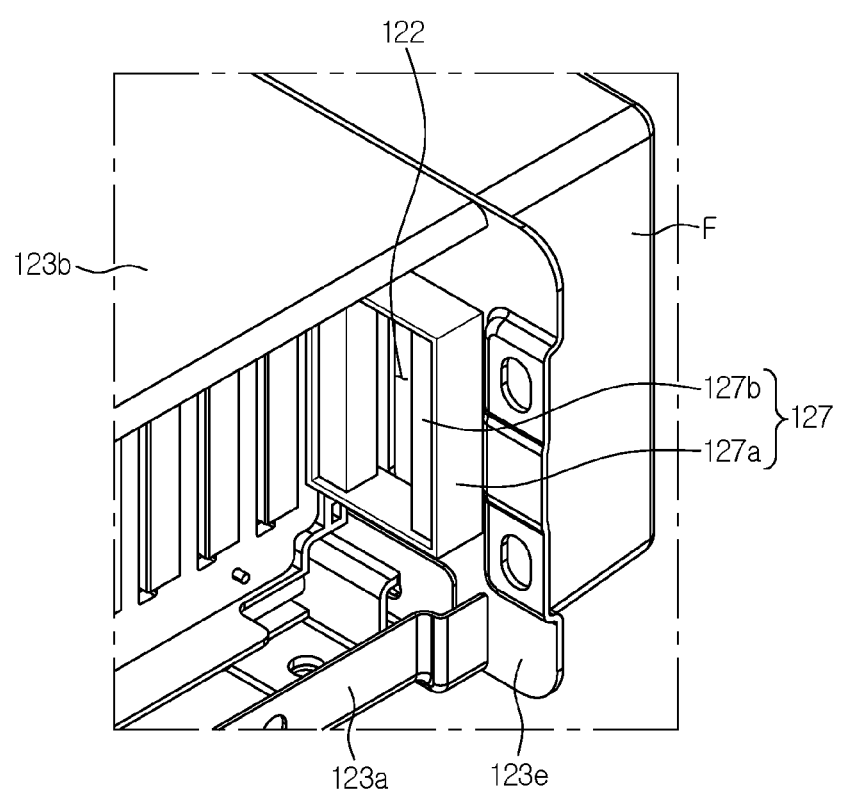
FIG. 9 is an enlarged diagram of an inner part of section B FIG. 7.
Figure 10:
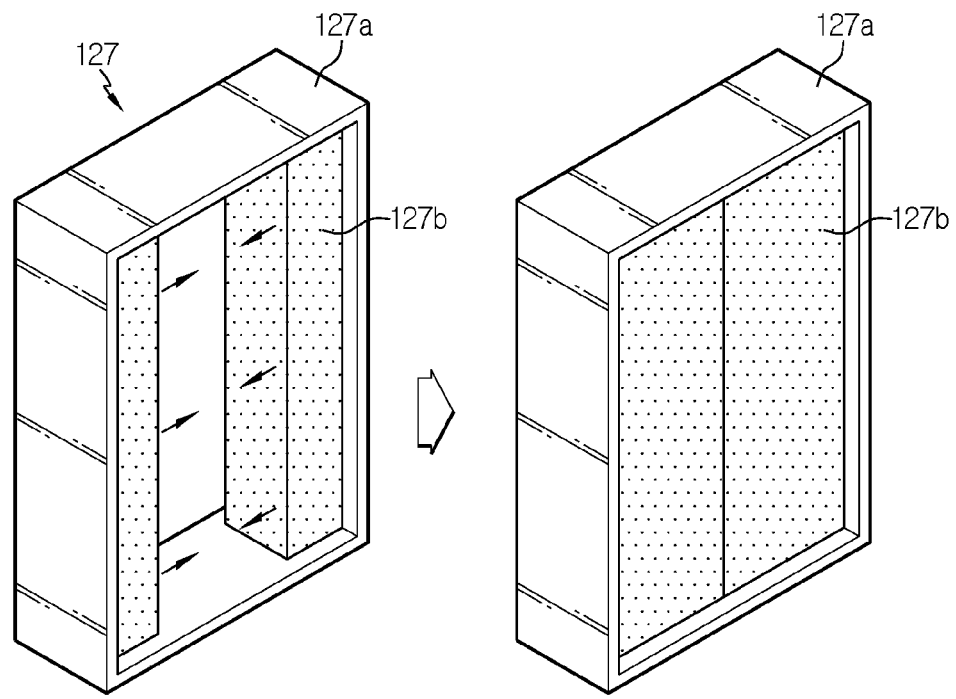
FIG. 10 is a diagram showing a water expandable member according to an embodiment of the present disclosure.
Figure 11:
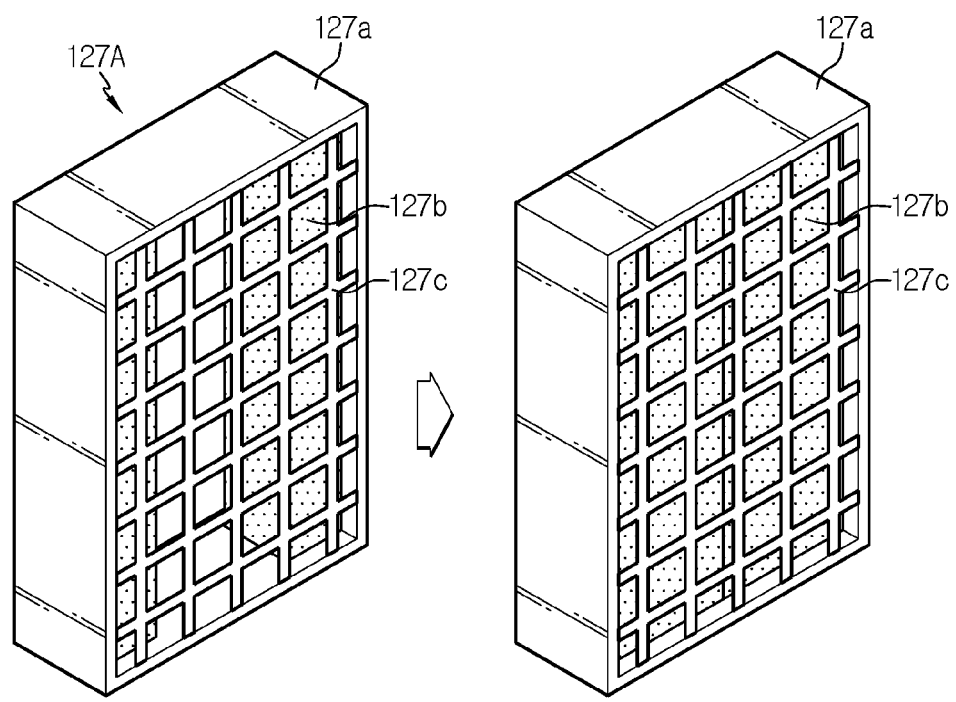
FIG. 11 is a diagram showing a variation of the water expandable member of FIG. 10.

More specifically, as shown in FIGS. 7 to 9, the water expandable member 127 includes a nonwoven fabric holder 127*a* and a superabsorbent nonwoven fabric 127*b*, and may be fixed and coupled to the inner surface of the module housing 123 having the air inlet 122, the air outlet 124 and the valve installation hole 126. As shown in FIGS. 10 and 11, the nonwoven fabric holder 127*a* forms a frame having a fixed shape before and after the expansion of the superabsorbent nonwoven fabric 127*b*.

The nonwoven fabric holder 127*a* may be in the shape of a rectangular frame having an empty space inside the edge, and may be made of a nonmetallic material having the electrical insulating property, for example, rubber, silicone, plastics or the like.

Additionally, as shown in FIG. 8, the edge of the nonwoven fabric holder 127*a* may surround the valve installation hole 126 and may be in close contact with the inner surface of the rear plate 123*f*. For example, the edge of the nonwoven fabric holder 127*a* may be closely attached and fixed to the inner surface of the rear plate 123*f* using a sealing adhesive or a screw. In this case, the empty space inside the edge of the nonwoven fabric holder 127*a* is placed in communication with the valve installation hole 126.

In this way, the air inlet 122 and the air outlet 124 may be in close contact with the inner surface of the corresponding module housing 123 such that the edge of the nonwoven fabric holder 127*a* surrounds the air inlet 122 and the air outlet 124.

The superabsorbent nonwoven fabric 127*b* may be attached to the inner surface of the nonwoven fabric holder 127*a*, in other words, the inner surface of the edge. The superabsorbent nonwoven fabric 127*b* contains resin which expands at a very high ratio when absorbing water, and when a sufficient amount of water is supplied, the superabsorbent nonwoven fabric 127*b* contains resin whose volume increases at least about 2 times compared to the initial volume. The resin used for the superabsorbent nonwoven fabric 127*b* may include, for example, super absorbent fiber (SAF), a polyester fiber or their mixed nonwoven fabric. The SAF may be in the form of a fiber made using super absorbent polymer (SAP).

Additionally, the superabsorbent nonwoven fabric 127*b* has a smaller size than the space inside the edge of the nonwoven fabric holder 127*a*. In particular, in the water expandable member 127 installed in the air inlet 122 and the air outlet 124, the superabsorbent nonwoven fabric 127*b* may preferably have a size of less than about 30% compared to the area of the air inlet 122 and the air outlet 124 for a smooth flow of air in normal condition.

Since the water expandable member 127 is provided in dry state during the initial assembly of the battery module 120, the water expandable member 127 does not close the air inlet 122 in normal condition. Accordingly, the outside air is allowed to enter and exit the module housing 123 in normal condition. However, when the firewater is emergently fed to the battery module 120 due to gas or flames occurred in the battery module 120, the superabsorbent nonwoven fabric 127*b* swells when it contacts water, and in this instance, the air inlet 122 is closed. When the air inlet 122 is closed, the firewater fed into the battery module 120 does not leak out and stays in the battery module 120, and accordingly, it is possible to suppress gas or flames occurred in the battery module 120 rapidly.

Meanwhile, as shown in FIG. 10, the superabsorbent nonwoven fabric 127*b* according to this embodiment may be provided in a pair, and the pair of superabsorbent nonwoven fabrics 127*b* may be attached to the left side wall and the right side wall of the nonwoven fabric holder 127*a* respectively, and when the superabsorbent nonwoven fabrics 127*b* contact water, the inside of the edge of the nonwoven fabric holder 127*a* may be blocked by the expansion of the superabsorbent nonwoven fabrics 127*b*. That is, as described above, since the air inlet 122 is surrounded by the edge of the nonwoven fabric holder 127*a*, when the empty space inside the edge is filled with the superabsorbent nonwoven fabric 127*b*, the air inlet 122 is closed. Here, closed does not necessarily represent completely closed that the firewater cannot leak, and may include closed to reduce the leakage amount.

Additionally, the superabsorbent nonwoven fabric 127*b* is not necessarily limited to those shown in the drawings. For example, the superabsorbent nonwoven fabric 127*b* may be attached to the inner surface of the edge of the rectangular frame shaped nonwoven fabric holder 127*a* in the shape of a rectangular ring, or may be attached to the upper or lower inner surface of the edge of the nonwoven fabric holder 127*a*.

Additionally, a variation of the water expandable member 127 of this embodiment may be provided as shown in FIG. 11. That is, the water expandable member 127 according to a variation may further include a mesh which covers at least one of the front or rear side of the nonwoven fabric holder 127*a*. The nonwoven fabric holder 127*a* having the mesh may be similar to a box shape having air permeability in which the superabsorbent nonwoven fabric 127*b* is received.

In the above-described embodiment, there is a risk that the superabsorbent nonwoven fabric 127*b* may be separated from the nonwoven fabric holder 127*a* due to the increased weight when it absorbs water or the pressure in the module housing 123. However, the water expandable member 127 according to this variation may include the mesh to remove the risk. That is, using the mesh as shown in this variation or a mesh of lattice pattern structure, it is possible to ensure air permeability in normal condition and guide and limit the expansion of the superabsorbent nonwoven fabric 127*b* into the nonwoven fabric holder 127*a* in case of emergency, and there is no risk that the superabsorbent nonwoven fabric 127*b* is separated from the nonwoven fabric holder 127*a* in the presence of the increased weight of the superabsorbent nonwoven fabric 127*b* or the pressure of the firewater.

For reference, since the feed valve nozzle 125 is installed at the valve installation hole 126, a mesh having an open center may be preferably applied to the water expandable member 127 to be installed at the corresponding location.

Subsequently, the battery module 120 according to another embodiment of the present disclosure will be described with reference to FIG. 12.

The battery module 120 according to another embodiment of the present disclosure includes substantially the same components as the above-described battery module 120 according to an embodiment of the present disclosure, only different in a valve installation hole 126A and a feed valve nozzle 125A.

Accordingly, in describing the battery module 120 according to another embodiment of the present disclosure, its related description is provided as below and overlapping descriptions with the previous embodiment are omitted herein.

The feed valve nozzle 125A according to this embodiment is integrally formed with the module housing 123, and provided in the module housing 123. Additionally, the valve installation hole 126A is formed corresponding to the diameter of the rear end of the feed valve nozzle 125A.

Figure 12:
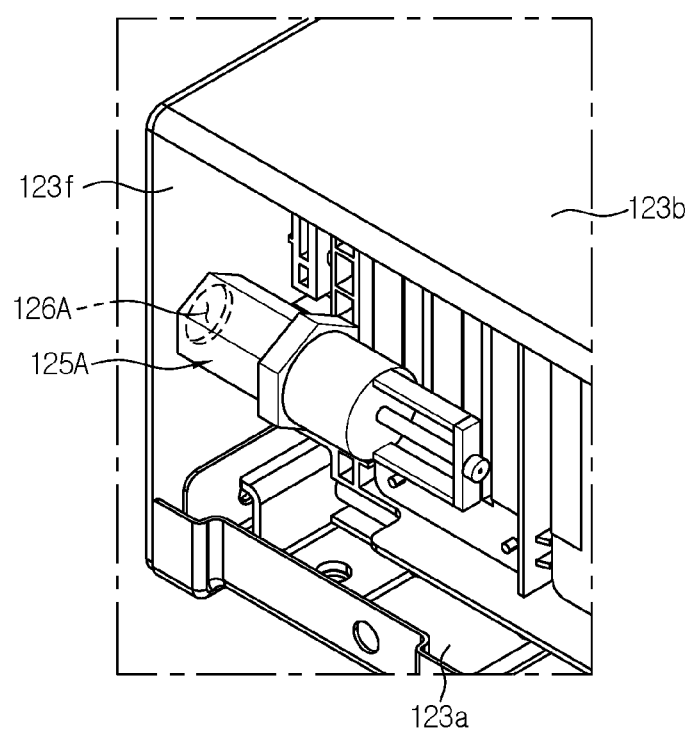
FIG. 12 is a diagram corresponding to FIG. 8 for describing according to another embodiment of the present disclosure.

Specifically, as shown in FIG. 12, the feed valve nozzle 125A may be integrally formed with the rear plate 123f. For example, the feed valve nozzle 125A may be welded or screw-coupled to the inner wall of the rear plate 123f. Additionally, the size of the valve installation hole 126 may be equal to or smaller than the inner diameter of the rear end of the feed valve nozzle 125A so that the valve installation hole 126 is completely closed by the feed valve nozzle 125A. The pipe 150 may be connected to the valve installation hole 126A to supply the firewater. In this case, since the corresponding part is air tight, in the case of this embodiment, the water expandable member 127 is only installed at the air inlet 122 and the air outlet 124.

As described above, when the firewater is fed to the air-cooled battery module 120, the battery module 120 according to the present disclosure is designed and configured to close the air vents to maintain the firewater at a predetermined water level in the module housing 123, thereby suppressing a fire more effectively and rapidly and preventing the fire propagation to the other battery modules 120.

Meanwhile, an energy storage system 200 according to the present disclosure may include at least one battery rack 100 including the battery modules 120.

Figure 13:
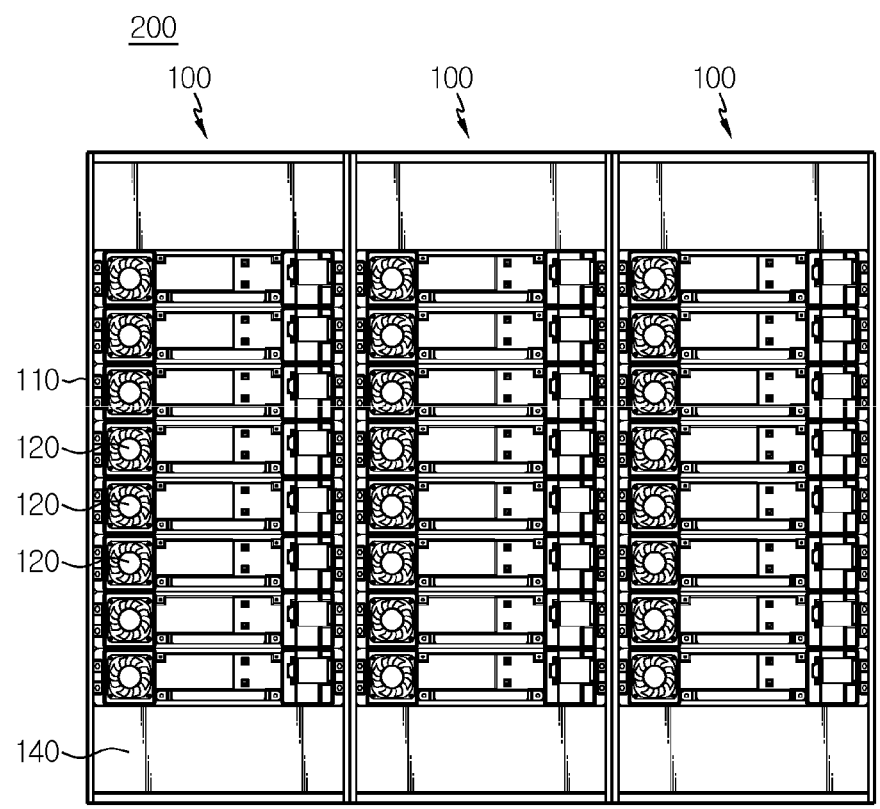
FIG. 13 is a diagram schematically showing an energy storage system according to an embodiment of the present disclosure.

The plurality of battery racks 100 may be successively arranged in a direction as shown in FIG. 13. Additionally, the energy storage system 200 may further include a Master Battery Management System (not shown) to control all the battery modules 120 and the battery racks 100.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

The terms indicating directions as used herein such as upper, lower, left, right, front and rear are used for convenience of description only, and it is obvious to those skilled in the art that the term may change depending on the position of the stated element or an observer.

What is claimed is:

1. A battery module, comprising:
a cell stack including a plurality of battery cells stacked in a direction;
a module housing having an internal space in which the cell stack is received and an air inlet and an air outlet through which air enters and exits;
a valve installation hole formed through a side wall of the module housing;
a feed valve nozzle disposed facing the internal space of the module housing at a location of the valve installation hole;
an expandable member provided in the module housing; and
a frame retaining the expandable member, the frame having a fixed shape,
wherein the expandable member absorbs fluid to expand in volume during operation of the feed valve nozzle to close at least one of the air inlet, the air outlet or the valve installation hole.

2. The battery module according to claim 1, wherein the frame is a nonwoven fabric holder having a space inside an edge and fixed and coupled to an inner surface of the module housing having the air inlet, the air outlet or the valve installation hole; and
wherein the expandable member is a superabsorbent nonwoven fabric attached to an inner surface of the nonwoven fabric holder.

3. The battery module according to claim 2, wherein the frame is a rectangular frame, and the superabsorbent nonwoven fabric is attached to each of a left side wall and a right side wall of the nonwoven fabric holder.

4. The battery module according to claim 2, wherein the space of the nonwoven fabric holder is in communication with the air inlet, the air outlet or the valve installation hole.

5. The battery module according to claim 2, wherein the edge of the nonwoven fabric holder surrounds the air inlet, the air outlet or the valve installation hole and is in contact with the inner surface of the module housing.

6. The battery module according to claim 2, wherein the expandable member further includes a mesh coupled to the nonwoven fabric holder to cover at least one of a front side or a rear side of the space of the frame.

7. The battery module according to claim 1, wherein the feed valve nozzle includes a glass bulb which blocks a channel through which the fluid will be forced out, and
wherein the glass bulb receives a liquid therein and is configured to break by volume expansion of the liquid at a predetermined temperature or above.

8. The battery module according to claim 1, wherein the feed valve nozzle is inserted into the module housing through the valve installation hole.

9. The battery module according to claim 1, wherein the feed valve nozzle is disposed in the module housing integrally with the module housing, and
wherein a diameter of the valve installation hole corresponds to a diameter of a rear end of the feed valve nozzle.

10. A battery rack, comprising:
a rack housing;
a plurality of battery modules according to claim 1, arranged on top of one another in the rack housing;
a water tank disposed in the rack housing or near the rack housing;
a pipe connecting the water tank to each battery module of the plurality of battery modules;
at least one sensor installed in the rack housing to detect thermal runaway occurring in at least one of the plurality of battery modules; and
a controller to output a control signal for feeding fluid into the battery module through the pipe when the thermal runaway is detected by the at least one sensor.

11. The battery rack according to claim 10, further comprising:
a plurality of control valves installed in the pipe,
wherein each of the plurality of control valves is installed near a respective one of the plurality of battery modules to individually allow or disallow a flow of the fluid fed into the plurality of battery modules,
wherein the at least one sensor is installed in each of the plurality of battery modules, and
wherein the controller outputs the control signal for opening the control valve installed near the battery module in which the thermal runaway was detected by the at least one sensor among the plurality of control valves.

12. An energy storage system comprising at least one battery rack according to claim 10.

13. The battery module according to claim 1, wherein the air inlet is in a first end wall of the module housing, and wherein the frame is attached to an inner surface of the first end wall and surrounds the air inlet.

14. The battery module according to claim 1, wherein a passage is formed through the frame when the expandable member has the unexpanded volume.

15. The battery module according to claim 1, wherein the frame is fixed to an inner surface of the module housing.

* * * * *